United States Patent [19]
Yokonuma et al.

[11] Patent Number: 5,634,157
[45] Date of Patent: *May 27, 1997

[54] INFORMATION RECORDING APPARATUS HAVING PARALLEL TO SERIAL AND PPM SIGNAL CONVERTERS

[75] Inventors: Norikazu Yokonuma, Yokohama; Hideo Hibino; Youichi Yamazaki, both of Kawasaki; Kazuyuki Kazami, Tokyo, all of Japan

[73] Assignee: Nikon Corporation, Tokyo, Japan

[*] Notice: The term of this patent shall not extend beyond the expiration date of Pat. No. 5,485,233.

[21] Appl. No.: 328,765

[22] Filed: Oct. 24, 1994

[30] Foreign Application Priority Data

Oct. 26, 1993 [JP] Japan ..................... 5-267145

[51] Int. Cl.⁶ ............................................. G03B 31/00
[52] U.S. Cl. ......................... 396/319; 360/3; 360/29; 360/22
[58] Field of Search ..................... 354/106, 105; 360/29, 69, 72.2, 22, 3; 359/135, 186; 371/70; 375/239; 380/50; 396/319

[56] References Cited

U.S. PATENT DOCUMENTS 5,485,233  1/1996  Yokonuma et al. ............... 360/22 X Primary Examiner—W. R. Young
Assistant Examiner—Patrick Wamsley
Attorney, Agent, or Firm—Oliff & Berridge

[57] ABSTRACT

A camera comprises a photographic information output circuit section, a CPU, a PPM signal conversion circuit section, a drive section for a plurality of magnetic heads, and a film feeding section. The CPU converts several parallel data items which are output from the photographic information output circuit section into a single serial data item and outputs it to the PPM signal conversion circuit section provided separately from the CPU. The PPM signal conversion circuit section converts this single serial data item into several PPM signals, and then supplies the PPM signals to the magnetic head drive section.

16 Claims, 9 Drawing Sheets

INFORMATION RECORDING APPARATUS HAVING PARALLEL TO SERIAL AND PPM SIGNAL CONVERTERS

BACKGROUND OF THE INVENTION

1. Field of the Invention

The present invention relates to an information recording apparatus which magnetically records information which consists of a plurality of bits by a PPM recording method.

2. Related Background Art

The PPM (pulse position modulation) recording method is a per se known method of magnetically recording data upon a magnetic recording medium. FIG. 9 is a waveform diagram illustrating this PPM recording method.

With the PPM recording method, the period of the signal is always kept fixed, and the signal levels "0" and "1" are coded by the position of the trailing edge of the signal waveform. In concrete terms, if the trailing edge of the signal waveform occurs between the start point of the period of the signal and its midpoint this is taken as encoding a "0", while if the trailing edge of the signal waveform occurs between the midpoint of the period of the signal and its end point this is taken as encoding a "1". For example, referring to FIG. 9, when the trailing edge of the signal waveform occurs at a position approximately one quarter period from the head of the signal period this is taken as encoding a "0" (in this case, called a PPM signal of 25% bit location), while when the trailing edge of the signal waveform occurs at a position approximately three quarters period from the head of the signal period this is taken as encoding a "1" (in this case, called a PPM signal of 75% bit location).

The above method enables data to be transmitted correctly even if the trailing edge position in the signal period is somewhat shifted due to a delay over the data line or other cause. When data of "0" is to be transmitted in FIG. 9, it is recognized as data of "0" so long as the signal waveform drops before its half period, even if the data that should drop at one quarter period from the head of the signal period is lagged to actually drop behind the quarter period due to a delay over the data line or other cause. As a result, an error in transmission of data is less likely to occur.

Meanwhile, there are known cameras of the type magnetically recording photographic information, such as the date and exposure data, on a film, and there is also a possibility of taking advantage of the above described PPM recording method for such magnetic recording.

A photographic information output circuit in the camera outputs parallel data for information, such as the date and exposure data. Consequently, the parallel data has to be converted into serial data first and then the serial data has to be converted into a PPM signal in the camera. A conventional camera converts the parallel data into the serial data and the serial data into the PPM signal by software process of a CPU.

However, the CPU takes much time to convert all photographic information into the PPM signals, because the CPU converts the parallel data which indicates the photographic information into the PPM signal one bit by one bit. On the other hand, the CPU has to process many functions, such as an exposure process and a film feeding process, in addition to the above described converting process. Consequently, if the CPU takes comparatively long time for the above described converting process, it influences other functions. For example, the speed of consecutive shots becomes slow.

Summary of the Invention

The object of the present invention is to provide an information recording apparatus which converts photographic information into PPM signals without using a CPU.

In order to attain this object, an information recording apparatus according to the present invention, which is capable of magnetically recording information on a magnetic medium, comprising: an information output circuit which outputs parallel data for the information; a clock output circuit which outputs a reference clock; a parallel to serial conversion circuit which converts the parallel data into serial data based on the reference clock; a PPM signal conversion circuit which is provided separately from the parallel to serial conversion circuit and converts the serial data which is output from the parallel to serial conversion circuit into a PPM signal based on the reference clock; and a magnetic recording device which magnetically records the converted PPM signal on the magnetic medium.

The information output circuit outputs the parallel data for the information, the clock output circuit outputs the reference clock, and the parallel to serial conversion circuit converts the parallel data into the serial data based on the reference clock and outputs the serial data. The PPM signal conversion circuit provided separately from the parallel to serial conversion circuit converts the serial data into the PPM signal based on the reference clock, and the magnetic recording device magnetically records the data of the PPM signal on the magnetic medium.

With the information recording apparatus according to the present invention, converting of the parallel data into the PPM signal can be done without using the CPU, whereby the load of the CPU is reduced.

DESCRIPTION OF THE PREFERRED EMBODIMENTS

First Embodiment

In the following, a first preferred embodiment of the present invention will be described in detail as applied to a camera with reference to FIGS. 1 through 4. In the block diagram, elements composing a camera which are not related to PPM recording are omitted.

Figure 1:
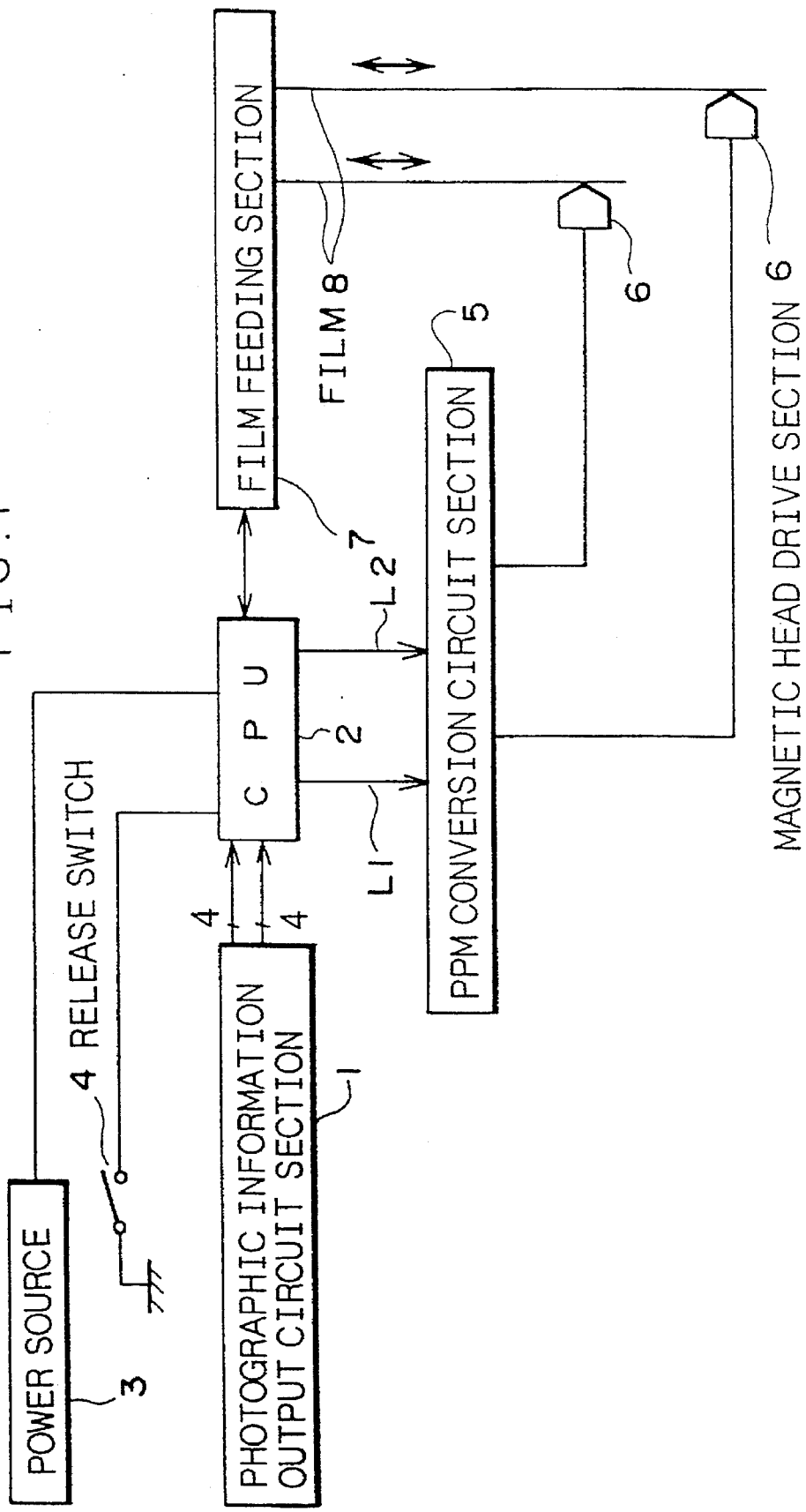
FIG. 1 is a block diagram showing a relevant portion of the mechanism of a camera, to which the present invention is applied.
Figure 2:
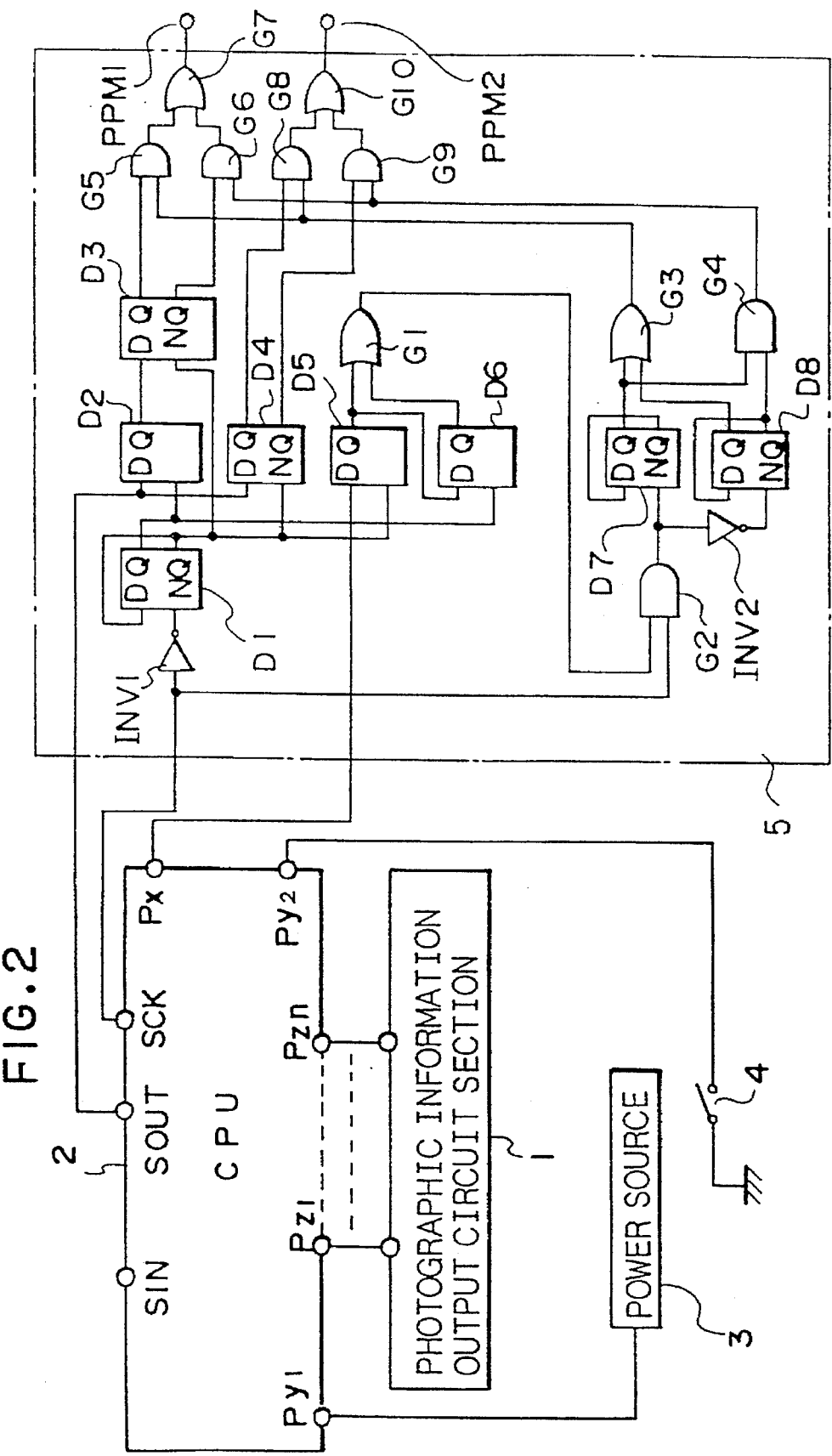
FIG. 2 is a circuit diagram for a first preferred embodiment of the present invention, incorporated in the camera.

In FIG. 1 the reference numeral 1 denotes a photographic information output circuit section which outputs in parallel a plurality of (in the shown example, two) data items of photographic information such as, for example, the time point of photography and the exposure, and the reference numeral 2 denotes a CPU which, as shown in FIG. 2, has as input terminals a power input terminal Py1 which is connected to a power source 3, a release signal input terminal Py2 which is connected to a release switch 4, and parallel data input terminals Pz1 through Pzn which are connected to the photographic information output circuit section 1. Further, this CPU 2 has as output terminals a serial data output terminal SOUT at which it outputs serial data, a serial data clock terminal SCK at which it outputs a clock signal for synchronizing the serial data output, and a transmission start signal terminal Px which provides information for the start of serial data transmission. A data line connected to the serial data output terminal SOUT is designated in FIG. 1 as L1, while control lines connected to the control terminals such as the serial data clock terminal SCK etc. are collectively designated as L2. Further, by way of example, it is assumed that in the FIG. 1 device two items of parallel data each consisting of four bits are output from the photographic information output circuit section 1 to the CPU 2.

The reference numeral 5 denotes a PPM conversion circuit section which converts the serial data supplied from the CPU 2 into a PPM signal, the detailed structure of which is shown in FIG. 2. As shown in FIG. 2, this PPM conversion circuit section 5 comprises D flip-flops D1 through D8, inverters INV1 through INV2, AND gates G2, G4, G5, G6, G8 and G9, and OR gates G1, G3, G7, and G10. This PPM conversion circuit section 5 separates the serial data output from the CPU 2 via its terminal SOUT into two sets of serial data PPM1 and PPM2.

The reference numerals 6 in FIG. 1 denote two magnetic head drive sections which control the process of magnetically recording on a film 8 the above described two PPM signals which are output from the PPM conversion circuit section 5; and 7 denotes a film feeding section which controls the winding on of the film 8.

Figure 3:
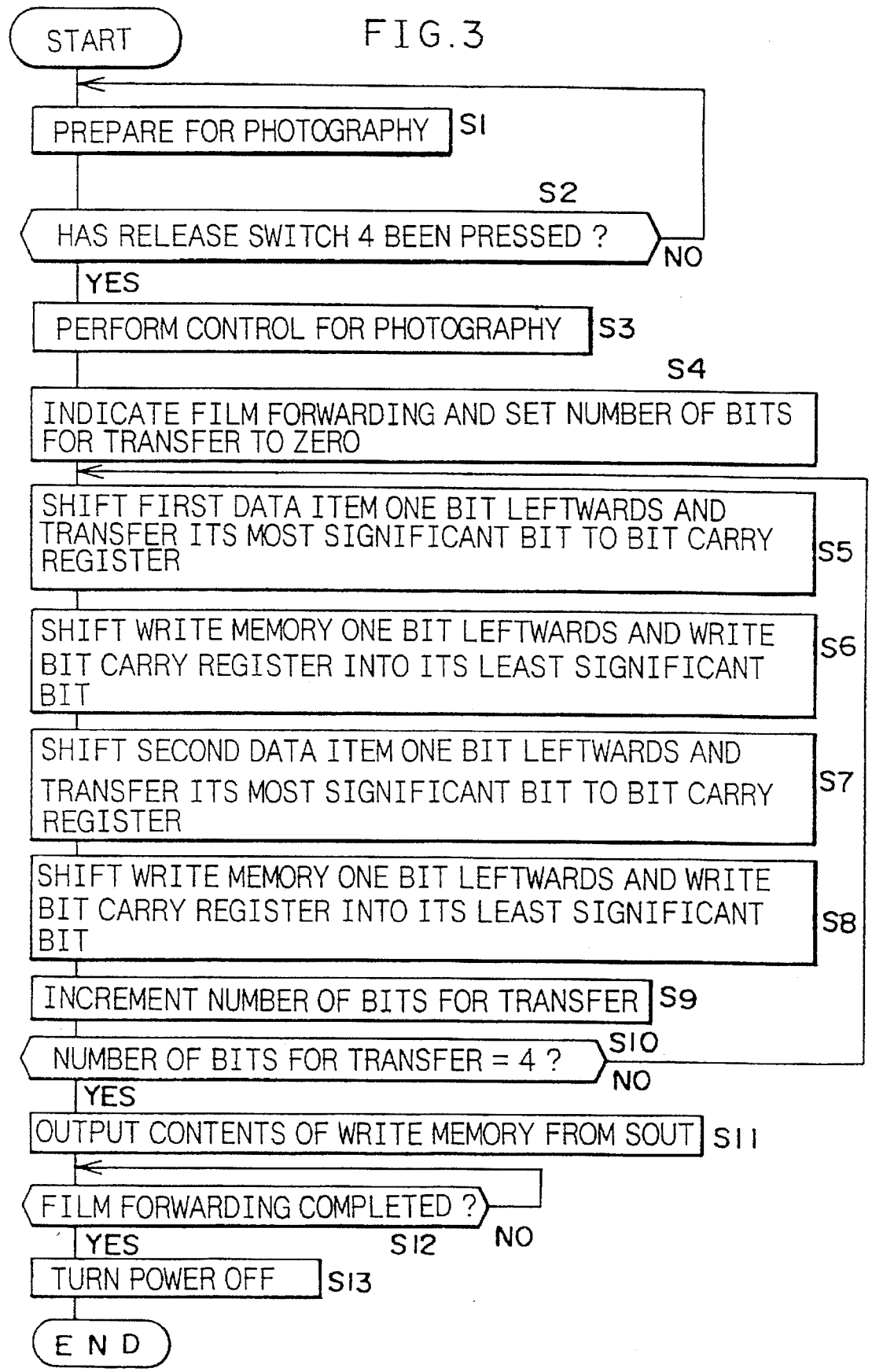
FIG. 3 is an overall flow chart for a program which is executed by a CPU 2, incorporated in the FIG. 2 circuit.
Figure 4:
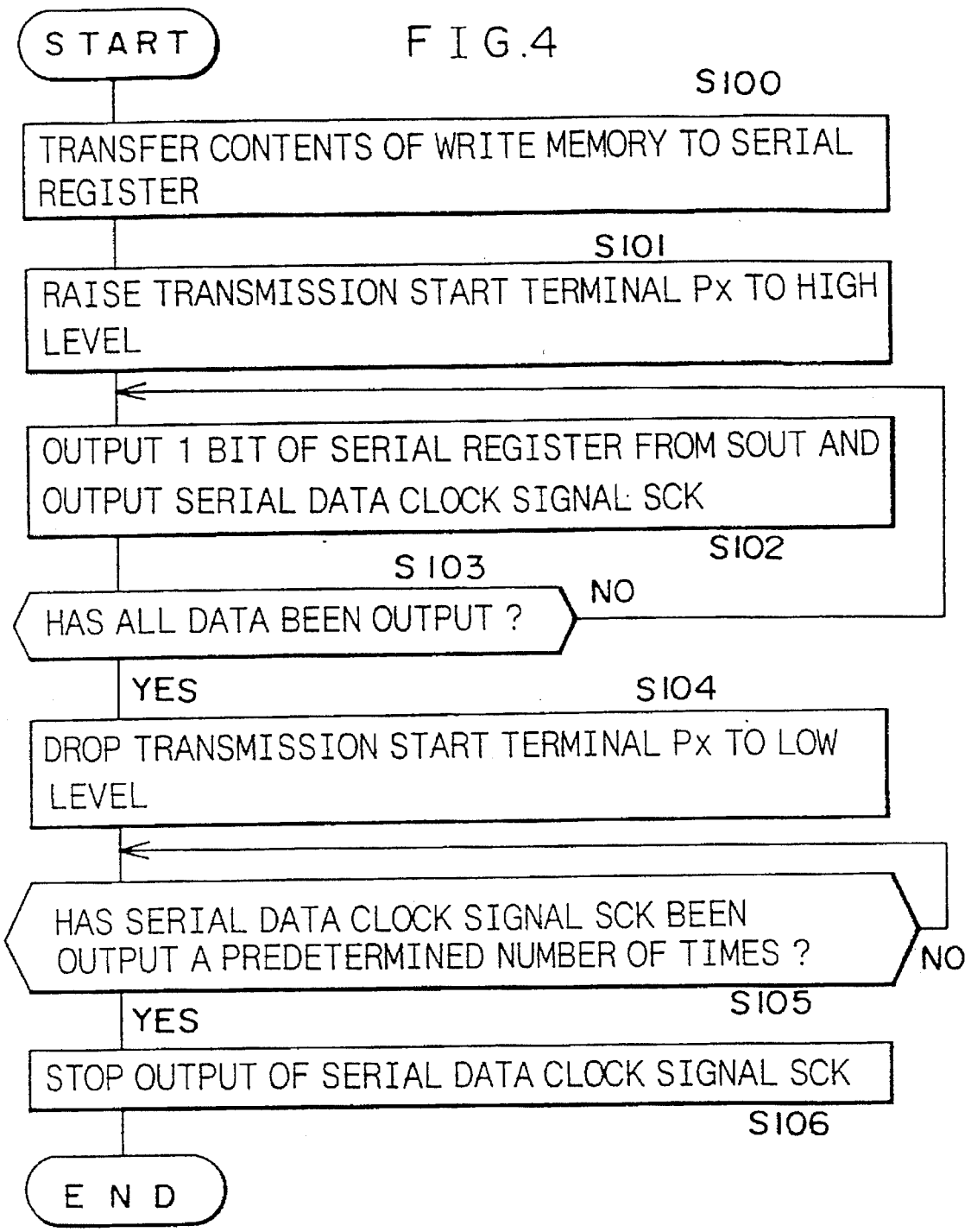
FIG. 4 is a flow chart showing the details of a program step S11 in FIG. 3 in which serial data output is performed.

FIGS. 3 and 4 are flow charts showing the operation of the CPU 2. The operation of this first preferred embodiment of the information recording apparatus of the present invention will now be explained with reference to FIGS. 1 through 4.

When the power source 3 has been turned on and the release switch 4 has been pressed, the CPU 2 starts to execute the program whose flow chart is shown in FIG. 3. In this flow chart and in the following explanation, the two data items of photographic information (which in this example may be the time point of photography and the exposure) output in parallel from the photographic information output circuit section 1 will be termed the first data item and the second data item; the four bits of which the first data item is composed will be termed, in order from the most significant bit downwards, d1, d2, d3, and d4; and the four bits of which the second data item is composed will be termed, in order from the most significant bit downwards, k1, k2, k3, and k4. Further, the number of bits in the write memory internal to the CPU 2 used for alternately storing each bit of the two parallel data items, and also the number of bits of the serial register internal to the CPU 2 used for serially outputting in order one bit at a time, will both be assumed to be 8 bits.

Referring to FIG. 3, in the step S1 normal preparations for photography such as measurement of the brightness of the object to be photographed and driving of the photographic lens for focusing and the like are performed. Next, in the step S2, it is detected whether or not the release switch 4 has been pressed, and if the release switch 4 has not been pressed the flow of control returns to the step S1, while if the release switch 4 has been pressed then the flow of control proceeds to the step S3. In this step S3, photographic control operations such as control of lens aperture and shutter control are performed. In the next step S4, along with instructing film winding to the film feeding section 7 after photography has been completed, the value of the number of bits of the data item to be transferred is set to zero. In the next step S5 (which is the start of the inner program loop from the step S10 to be described hereinafter) the four bits contained in the first data item are shifted one bit at a time leftwards (in the direction of the most significant bit) and the most significant bit is transferred to a bit carry register. Accordingly, in this first cycle through the inner program loop, the value of the bit d1 is transferred to the bit carry register. In the next step S6, the eight bits of a write memory are shifted one bit at a time leftwards and the contents of the bit carry register are written into the least significant bit of the write memory. Accordingly, in this first cycle through the inner program loop, the value of the bit d1 is written into this least significant bit of the write memory.

In the next step S7 the four bits contained in the second data item are shifted one bit at a time leftwards and the most significant bit is transferred to the bit carry register. In the next step S8, the eight bits of the write memory are shifted one bit at a time leftwards and the contents of the bit carry register are written into the least significant bit of the write memory. And in the next step S9 the value of the number of bits to be transferred is incremented by one.

Next, in the decision step S10, a decision is made as to whether or not the value of the number of bits to be transferred has become equal to 4. If the value of the number of bits to be transferred has not yet become equal to 4 then the flow of control returns back to the step S5, and the above described process is repeated, so that the first data item and the second data item are alternately written one bit at a time into the least significant bit of the write memory and the contents of the write memory are shifted one bit at a time leftwards. Accordingly, the first data item and the second data item are written into the write memory in an interleaved manner with their bits being stored in the order d1→k1→ d2→k2→d3→k3→d4→k4. 0n the other hand, if in the step S10 it is determined that the value of the number of bits to be transferred has become equal to 4, then the flow of control proceeds to the step S11, in which as will be described in detail hereinafter the contents of the write memory are output from the serial data output terminal SOUT. Finally in the step S12 a decision is made as to whether or not the film feeding process has been completed, and program control waits in a tight loop until the result of this test is YES, after which in the step S13 the power source 3 is turned off and processing terminates.

FIG. 4 is a flow chart which shows the details of the above described step S11 for performing serial data output. In the first step S100, the 8 bits contained in the write memory are transferred to a serial register provided within the CPU 2. In the next step S101, the transmission start signal terminal Px is raised to high level, thus indicating the start of data transmission by the PPM conversion circuit section 5. In the next step S102, which forms part of the inner loop of this program section, the 8 bits of the serial register are output one bit at a time in order from the serial data output terminal SOUT, and each time one bit is thus output a serial data clock signal is simultaneously output from the serial data clock terminal SCK. And next in the decision step S103 a decision is made as to whether or not all the serial data has been output, and if serial data still remain to be output the flow of control returns back to the step S102 again.

When on the other hand all the serial data has thus been output, the flow of control proceeds to the step S104, in which the transmission start signal terminal Px is dropped to low level. In the next decision step S105, a decision is made as to whether or not the serial data clock signal has been output a predetermined number of times, and the system loops back to this decision step S105 in a tight loop until the result of this decision is YES. When in fact the serial data clock signal has been output a predetermined number of times, the flow of control proceeds to the last step S106 of this program portion, in which output of the serial data clock signal is terminated, and then this program portion ends.

In this manner, according to this first preferred embodiment, the CPU 2 outputs both the serial data from the terminal SOUT and the serial data clock signal from the terminal SCK which synchronizes with the serial data. The serial data clock signal from the terminal SCK is continued to be output even after transmission of the serial data from the terminal SOUT has been completed, so that all the PPM signals can be created. If the output from the serial data clock terminal SCK is stopped in response to completion of the transmission of the serial data from the terminal SOUT, a part of the PPM signal cannot be created as shown in FIG. 5 mentioned later.

Figure 5:
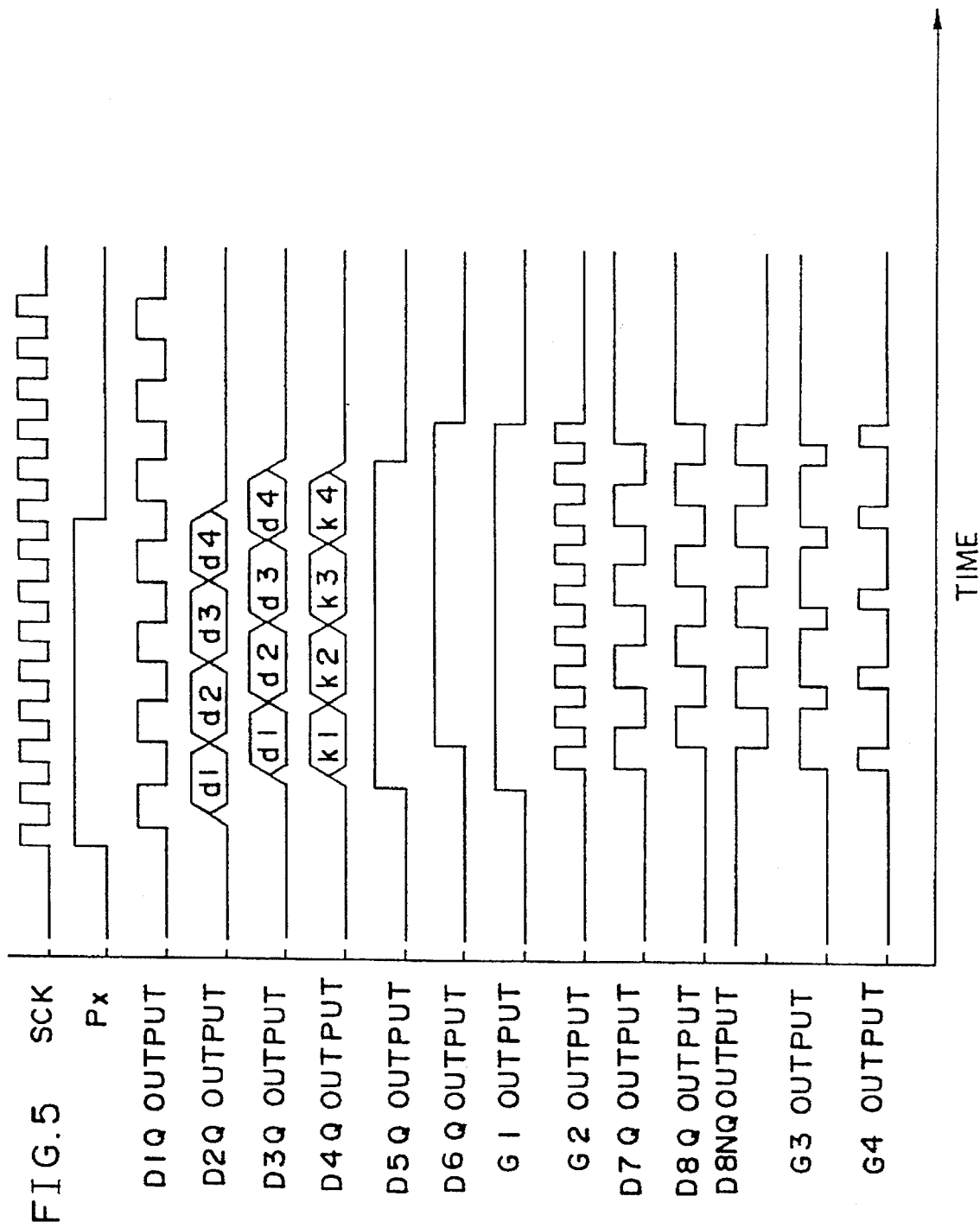
FIG. 5 is a timing chart for explanation of the operation of the FIG. 2 circuit.

FIG. 5 is a timing chart for presenting the timing of certain signals at various portions of the PPM conversion circuit section 5 shown in FIG. 2. The operation of this PPM conversion circuit section 5 will now be explained with reference to FIGS. 2 and 5.

The serial data clock signal output by the CPU 2 at its SCK terminal is inverted by the inverter INV1 and the flip-flop D1 divides the frequency of the output of the inverter INV1 by 2. The flip-flop D2 latches the serial data output from the terminal SOUT according to the Q output of the flip-flop D1, and by doing this the first data item in the serial data output from the terminal SOUT is extracted. The Q output of the flip-flop D2 is input to the D terminal of the flip-flop D3, and is latched by the leading edge of the NQ output of the flip-flop D1.

On the other hand, the flip-flop D4 latches the serial data output from the terminal SOUT according to the NQ output of the flip-flop D1, and by doing this the second data item in the serial data output from the terminal SOUT is extracted. In this way, the first data item and the second data item are extracted with identical timings by the Q outputs of the flip-flops D3 and D4.

The flip-flop D5 latches the transmission start signal at the terminal Px by the leading edge of the NQ output of the flip-flop D1, and the flip-flop D6 latches the Q output of the flip-flop D5 by the leading edge of the Q output of the flip-flop D1. The OR gate G1 outputs the logical sum of the Q outputs of the flip-flops D5 and D6. This OR gate G1 outputs continually high level signal for the period for which the PPM signal is output.

The AND gate G2 outputs the logical product of the serial data clock signal at the terminal SCK and the output of the OR gate G1. The flip-flop D7 divides the frequency of the output of the AND gate G2 by 2 according to the leading edge of the output of the AND gate G2. On the other hand, the flip-flop D8 divides the frequency of the output of the AND gate G2 by 2 according to the trailing edge of the output of the AND gate G2.

The OR gate G3 outputs the logical sum of the Q outputs of the flip-flops D7 and D8, and this output of the OR gate G3 becomes the "1" value of the PPM signal. The AND gate G4 outputs the logical product of the Q output of the flip-flop D7 and the NQ output of the flip-flop D8, and this output of the AND gate G4 becomes the "0" value of the PPM signal. The AND gate G5 outputs the logical product of the Q output of the flip-flop D3 and the output of the OR gate G3, and the AND gate G6 outputs the logical product of the NQ output of the flip-flop D3 and the output of the AND gate G4. The OR gate G7 outputs the logical sum of the output of the AND gate G5 and the output of the AND gate G6, and by the signal PPM1, which is this output of the OR gate G7, the first data item from the photographic information output circuit section 1 is converted into the PPM signal and is output.

On the other hand, the AND gate G8 outputs the logical product of the Q output of the flip-flop D4 and the output of the OR gate G3, and the AND gate G9 outputs the logical product of the NQ output of the flip-flop D4 and the output of the AND gate G4. The OR gate G10 outputs the logical sum of the output of the AND gate G8 and the output of the AND gate G9, and by the signal PPM2, which is this output of the OR gate G10, the second data item from the photographic information output circuit section 1 is converted into the PPM signal and is output.

The signal PPM 1 which is the output of the above described OR gate G7 and the signal PPM 2 which is the output of the above described OR gate G10 are individually separately supplied to the magnetic head drive section 6 shown in FIG. 1, and are magnetically recorded on the film 8.

In this manner, according to the first preferred embodiment, since the CPU 2 outputs both the serial data and the serial data clock which synchronizes with the serial data, it is possible to convert the serial data into the PPM signal outside the CPU 2 by using the serial data and the serial data clock. Consequently, the CPU 2 does not need to perform the process of converting into the PPM signal and can prepare for the next photographing immediately after the current photographing is done. As a result, the speed of consecutive shots is improved.

In the above described first preferred embodiment, the system clock of the CPU (not shown in Figures) or other clock signals (for example, a divided system clock) can be used as the serial data clock from the terminal SCK.

Second Embodiment

With the above described first preferred embodiment of the present invention, the CPU 2 executes a control program according to the flow chart shown in FIG. 3 for converting into serial data the parallel data which has been output from the photographic information output circuit section 1, but it is also possible to realize these functions in hardware rather than in software. The second preferred embodiment of the present invention, now to be described, is of this type; and the circuitry in this case is shown in FIG. 6, which corresponds to FIG. 2 for the first preferred embodiment.

Figure 6:
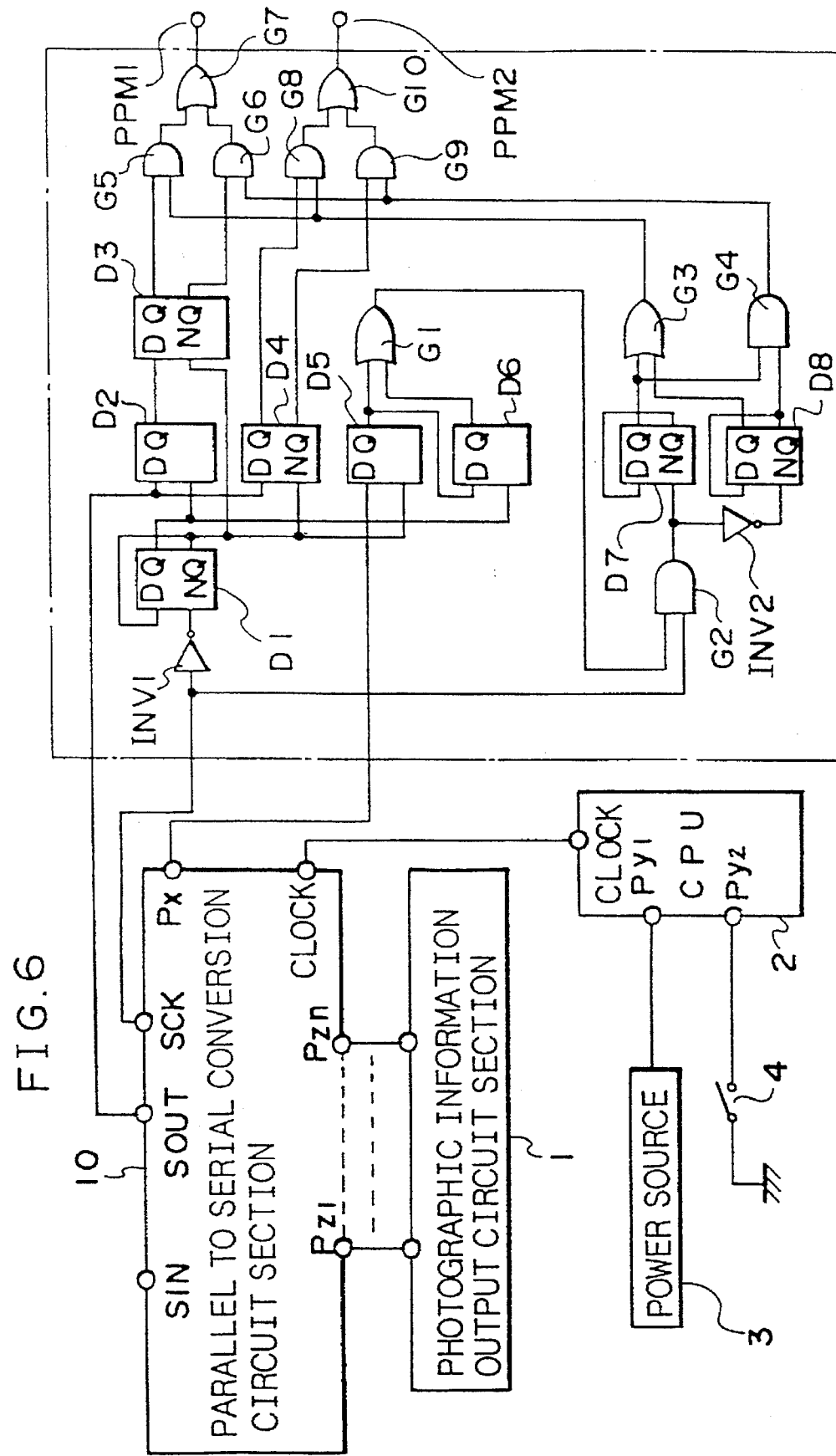
FIG. 6 is a circuit diagram for a second preferred embodiment of the present invention, corresponding to FIG. 2 for the first preferred embodiment.
Figure 7:
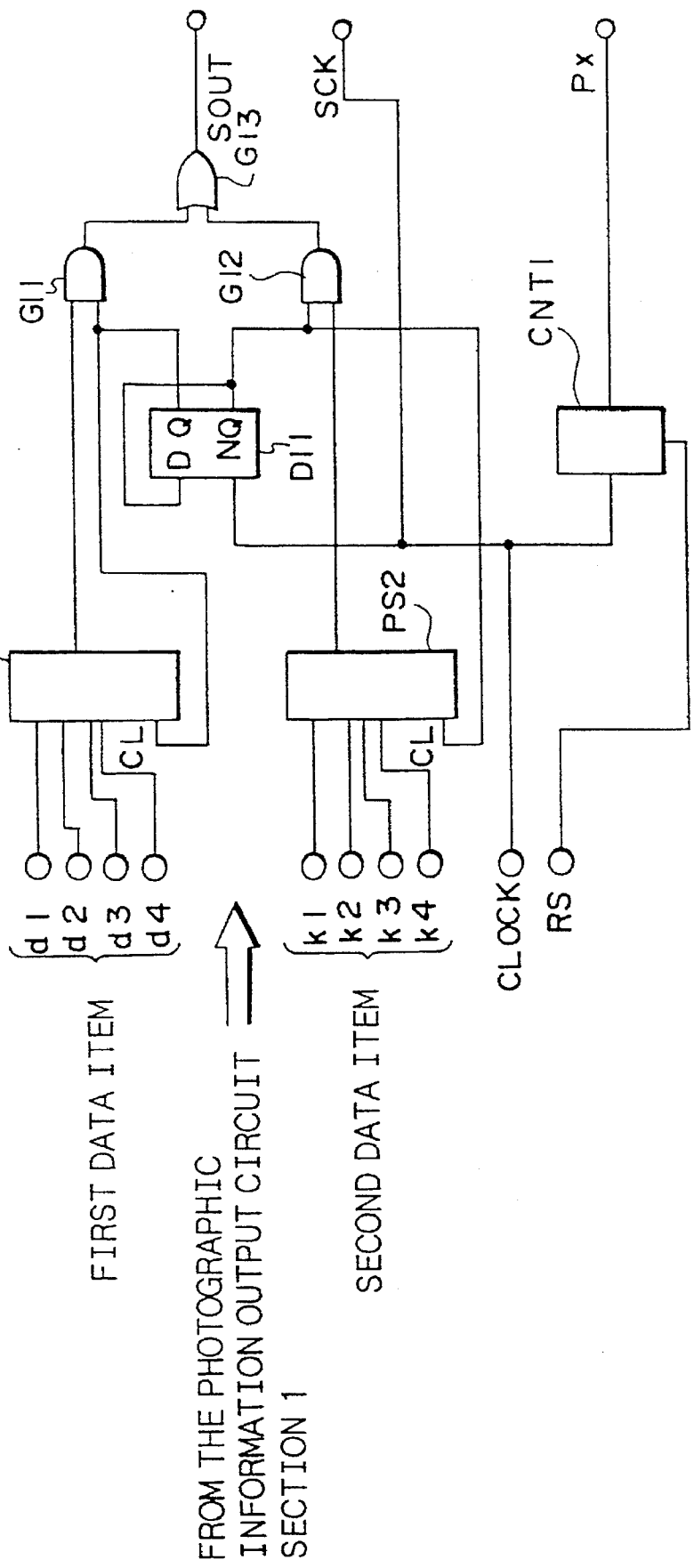
FIG. 7 is a circuit diagram for a parallel to serial conversion circuit section incorporated in this second preferred embodiment.
Figure 8:
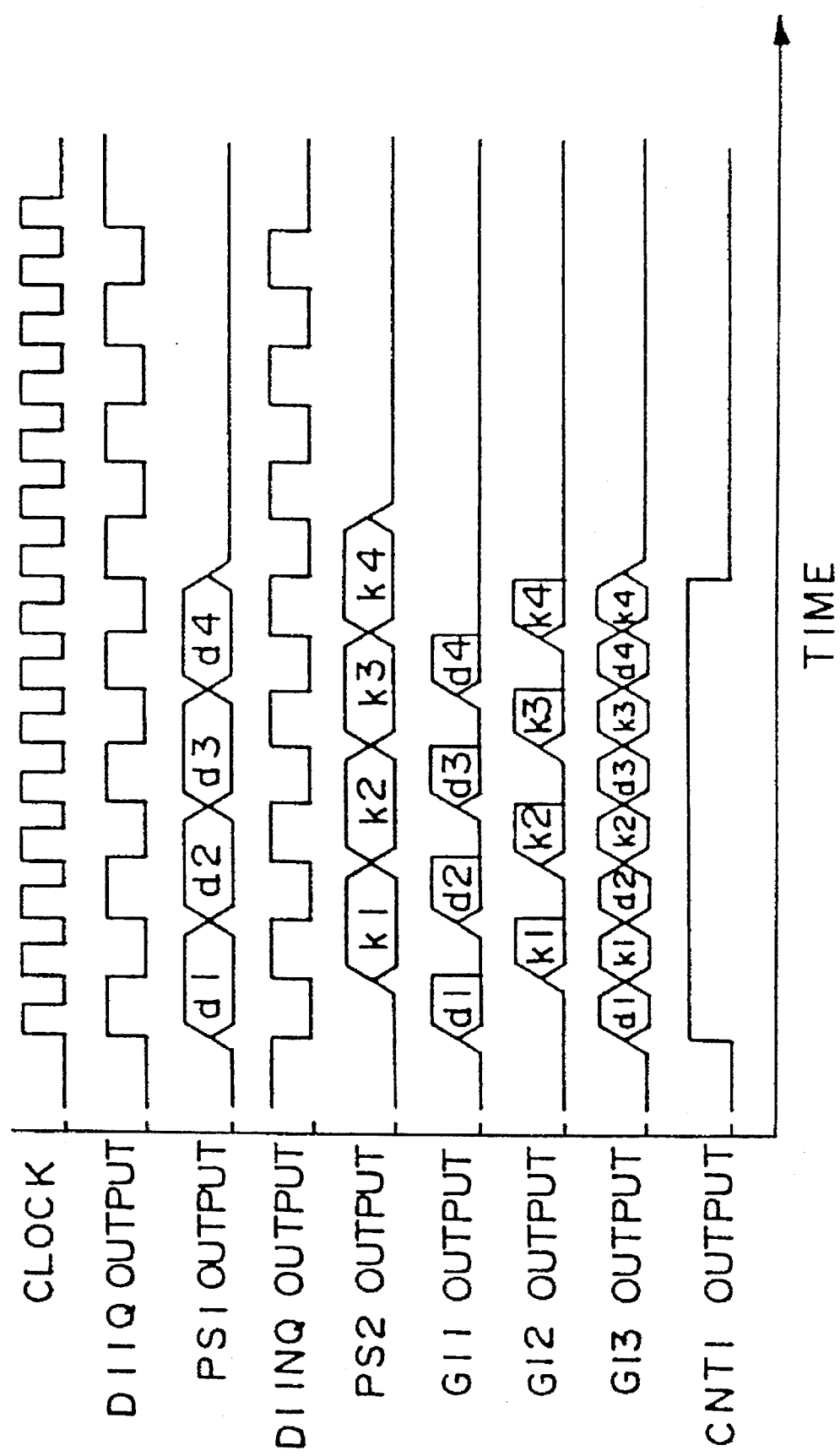
FIG. 8 is a timing chart for explanation of the operation of the FIG. 7 circuit.
Figure 9:
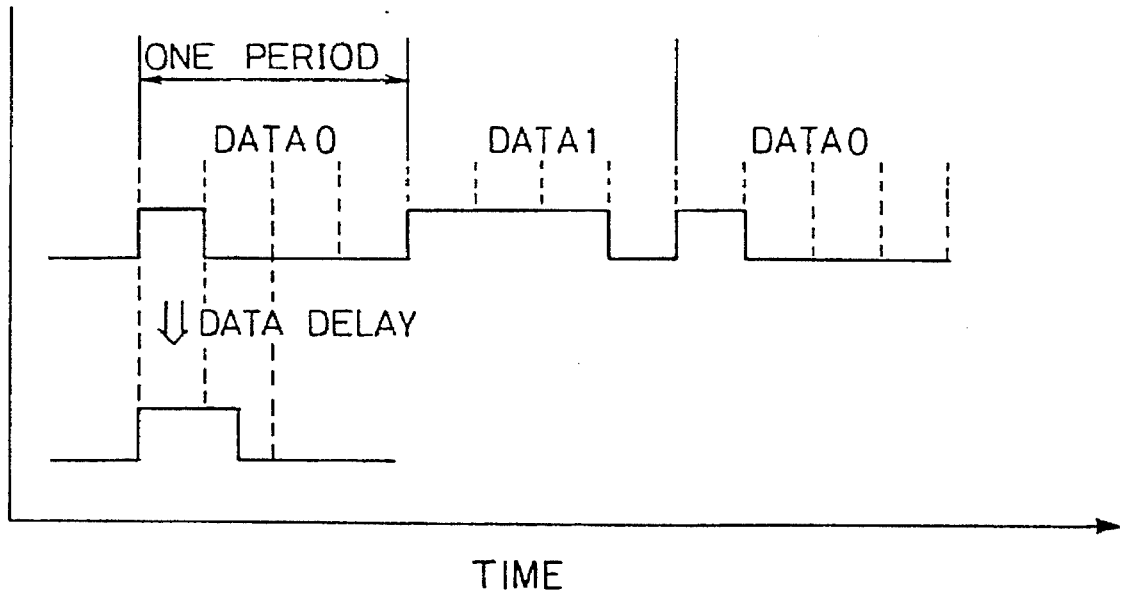
FIG. 9 is a waveform diagram illustrating a per se known PPM recording method.

Referring to FIG. 6, the reference numeral 10 denotes a parallel to serial conversion circuit section, the details of the construction of which are shown in FIG. 7. As shown in that figure, this parallel to serial conversion circuit section 10 comprises serial registers PS1 and PS2, a flip-flop D11, AND gates G11 and G12, an OR gate G13, and a counter CNT1. Further, FIG. 8 is a timing chart showing the operation of this parallel to serial conversion circuit section 10.

The parallel data which has been output from the photographic information output circuit section 1 is input to the input terminals Pz1 through Pzn of this parallel to serial conversion circuit section 10. And also a system clock signal CLOCK which has been output from the CPU 2 is input to a clock terminal CLOCK of the parallel to serial conversion circuit section 10. And, based upon this clock signal, the parallel to serial conversion circuit section 10 outputs the serial data output signal from its terminal SOUT and the serial data clock signal from its terminal SCK, and inputs them to the PPM conversion circuit section 5.

Referring to FIG. 7, the flip-flop D11 divides the frequency of the clock signal CLOCK from the CPU 2 by 2. The Q output of this flip-flop D11 is input to the clock terminal of the shift register PS1. Further, the first data item which has been output from the photographic information output circuit section 1 is supplied to the data terminals of this shift register PS1, and this first data item is converted into serial data and is output from the output terminal of this shift register PS1.

Similarly, the NQ output of this flip-flop D11 is input to the clock terminal of the shift register PS2. Further, the second data item which has been output from the photographic information output circuit section 1 is supplied to the data terminals of this shift register PS2, and this second data item is converted into serial data and is output from the output terminal of this shift register PS2.

As shown in FIG. 8, the outputs of these shift registers PS1 and PS2 have a period of two pulses of the system clock signal CLOCK. An AND gate G11 outputs the logical product of the Q output of the flip-flop D11 and the output of the shift register PS1, while an AND gate G12 outputs the logical product of the NQ output of the flip-flop D11 and the output of the shift register PS2. Referring again to FIG. 8, these AND gates G11 and G12 output the first data item and the second data item, respectively, with the lengths of those bits thereof which are equal approximately with the length of a period of the system clock signal CLOCK. An OR gate G13 outputs the logical sum of the output of the AND gate G11 and the output of the AND gate G12, and thus this output of the OR gate G13 consists of the first data item and the second data item in alternatingly interleaved form, as shown in FIG. 8. CNT1 is a counter, and when a reset signal is input to its reset terminal RS the counter CNT1 brings the transmission start signal which is output from the terminal Px to low level, while when this reset is released the counter CNT1 counts the number of pulses of the system clock signal CLOCK. While this count is continuing, the transmission start signal which is output from the terminal Px is maintained at high level, and when a predetermined number of clock pulses have been counted again the counter CNT1 brings the transmission start signal which is output from the terminal Px to low level. As shown in FIG. 8, this transmission start signal is thus maintained at high level during just that time interval in which serial data is being output from the serial data output terminal SOUT.

In this manner, according to this second preferred embodiment, since the process of converting the parallel data which is output from the photographic information output circuit section 1 into the serial data is also performed outside the CPU 2, the load of the CPU 2 is reduced much more.

Now, although for the purposes of example in the above described first and second preferred embodiments of the present invention two items of parallel data were combined and were converted into a single serial data item, this is not to be considered to limit the present invention: it would also be possible, according to the principles of the present invention, to combine three or more items of parallel data and to convert them into a single serial data item. Further, the number of bits in each of the parallel data items is not to be considered as being limited to four. Yet further, the present invention is capable of application, regardless the nature of the plurality of parallel data items which are input to the CPU 2. Also, although the information recording apparatus of the present invention has been described in terms of the above described first and second preferred embodiments which relate to its particular application to a camera, in fact the present invention can be applied very widely to various other devices as well, other than a camera, such as for example to a tape recorder or a cassette streamer or the like. Accordingly, although the present invention has been shown and described in terms of several preferred embodiments thereof, it is not to be considered as being limited by any of the perhaps quite fortuitous details of the embodiments or of the drawings, but only by the terms of the appended claims, which follow.

What is claimed is:

1. An information recording apparatus capable of magnetically and separately recording a plurality of pieces of information on a magnetic medium, comprising:

an information output circuit which outputs a plurality of parallel data for said plurality of pieces of information;

a clock output circuit which outputs a reference clock;

a parallel to serial conversion circuit which converts said plurality of parallel data into one serial data based on said reference clock;

a PPM signal conversion circuit which is provided separately from said parallel to serial conversion circuit and converts said serial data which is output from said parallel to serial conversion circuit into a plurality of PPM signals based on said reference clock; and a plurality of magnetic recording devices which magnetically record said plurality of PPM signals on said magnetic medium, respectively.

2. An information recording apparatus according to claim 1, wherein said parallel to serial conversion circuit outputs a transmission start signal having a predetermined level to said PPM signal conversion circuit while said parallel to serial conversion circuit is outputting said serial data.

3. An information recording apparatus according to claim 1, wherein said clock output circuit changes period for which said reference clock is being output according to an amount of said serial data which is output from said parallel to serial conversion circuit.

4. An information recording apparatus according to claim 1, wherein said parallel to serial conversion circuit is essentially constituted by a central processing unit, and said PPM signal conversion circuit is provided separately from said central processing unit.

5. An information recording apparatus according to claim 4, wherein said clock output circuit is essentially constituted by said central processing unit, and outputs said reference clock based on a system clock of said central processing unit.

6. An information recording apparatus according to claim 1, wherein said PPM signal conversion circuit simultaneously outputs said plurality of PPM signals.

7. An information recording apparatus according to claim 1, wherein said one serial data is formed so that bits of each of said plurality of parallel data are combined into said one serial data.

8. An information recording apparatus according to claim 1, wherein said parallel to serial conversion circuit and said PPM signal conversion circuit are provided separately from a central processing unit.

9. A camera equipped with an information recording apparatus capable of magnetically and separately recording a plurality of pieces of information related to photography on a magnetic medium, comprising:

a photographic information output circuit which outputs a plurality of parallel data for said plurality of pieces of information related to photography;

a clock output circuit which outputs a reference clock;

a parallel to serial conversion circuit which converts said plurality of parallel data into one serial data based on said reference clock;

a PPM signal conversion circuit which is provided separately from said parallel to serial conversion circuit and converts said serial data which is output from said parallel to serial conversion circuit into a plurality of PPM signals based on said reference clock; and a plurality of magnetic recording devices which magnetically record said plurality of PPM signals on said magnetic medium, respectively.

10. A camera equipped with an information recording apparatus according to claim 9, wherein said parallel to serial conversion circuit outputs a transmission start signal having a predetermined level to said PPM signal conversion circuit while said parallel to serial conversion circuit is outputting said serial data.

11. A camera equipped with an information recording apparatus according to claim 9, wherein said clock output circuit changes period for which said reference clock is being output according to an amount of said serial data which is output from said parallel to serial conversion circuit.

12. A camera equipped with an information recording apparatus according to claim 9, wherein said parallel to serial conversion circuit is essentially constituted by a central processing unit, and said PPM signal conversion circuit is provided separately from said central processing unit.

13. A camera equipped with an information recording apparatus according to claim 11, wherein said clock output circuit is essentially constituted by said central processing unit, and outputs said reference clock based on a system clock of said central processing unit.

14. A camera equipped with an information recording apparatus according to claim 9, wherein said parallel to serial conversion circuit and said PPM signal conversion circuit are provided separately from a central processing unit.

15. An information recording apparatus capable of magnetically and separately recording a plurality of pieces of information on a magnetic medium, comprising:

information output means for outputting a plurality of parallel data for said plurality of pieces of information;

clock output means for outputting a reference clock;

parallel to serial conversion means for converting said plurality of parallel data into one serial data based on said reference clock;

PPM signal conversion means, which is provided separately from said parallel to serial conversion means, for converting said serial data which is output from said parallel to serial conversion means into a plurality of PPM signals based on said reference clock; and plurality of magnetic recording means for magnetically recording said plurality of PPM signals on said magnetic medium, respectively.

16. A camera equipped with an information recording apparatus capable of magnetically and separately recording a plurality of pieces of information related to photography on a magnetic medium, comprising:

photographic information output means for outputting a plurality of parallel data for said plurality of pieces of information related to photography;

clock output means for outputting a reference clock;

parallel to serial conversion means for converting said plurality of parallel data into one serial data based on said reference clock;

PPM signal conversion means, which is provided separately from said parallel to serial conversion means, for converting said serial data which is output from said parallel to serial conversion means into a plurality of PPM signals based on said reference clock; and plurality of magnetic recording means for magnetically recording said plurality of PPM signals on said magnetic medium, respectively.

\* \* \* \* \*